(12) United States Patent
Stahel et al.

(10) Patent No.: US 6,939,029 B1
(45) Date of Patent: Sep. 6, 2005

(54) MODULAR LIGHT ASSEMBLY FOR DECORATIVE LIGHTS

(75) Inventors: Alwin J. Stahel, St. Paul, MN (US); David C. Abbe, El Cajon, CA (US); Thomas H. Rudd, Hudson, WI (US)

(73) Assignee: Kuryakyn Holdings, Inc., Somerset, WI (US)

( * ) Notice: Subject to any disclaimer, the term of this patent is extended or adjusted under 35 U.S.C. 154(b) by 110 days.

(21) Appl. No.: 10/446,300

(22) Filed: May 28, 2003

Related U.S. Application Data

(60) Provisional application No. 60/383,514, filed on May 28, 2002.

(51) Int. Cl.[7] .............................. F21S 8/10; F21V 7/05
(52) U.S. Cl. ...................... 362/545; 362/240; 362/247; 362/249; 362/368; 362/516; 362/549
(58) Field of Search ................................ 362/235–237, 362/240, 241, 245, 247, 249, 252, 545, 812, 362/368, 516, 549, 800; 200/317

(56) References Cited

U.S. PATENT DOCUMENTS

| | | | |
|---|---|---|---|
| 3,788,532 A | 1/1974 | Bish ............................. 224/31 |
| 4,136,375 A * | 1/1979 | Kewley ....................... 362/247 |
| 4,254,453 A * | 3/1981 | Mouyard et al. ............ 362/240 |
| 4,380,130 A * | 4/1983 | Bachmann et al. ............ 40/584 |
| 4,680,678 A * | 7/1987 | Iwaki .......................... 362/545 |
| 4,733,335 A * | 3/1988 | Serizawa et al. ............ 362/545 |
| 4,751,619 A | 6/1988 | Philippe et al. ................ 362/80 |
| 4,951,179 A * | 8/1990 | Machida ...................... 362/245 |
| 4,965,704 A | 10/1990 | Osborne, Sr. ................. 362/81 |
| 5,038,255 A | 8/1991 | Nishihashi et al. ............ 362/61 |
| 5,142,454 A | 8/1992 | Green ........................... 362/61 |
| 5,260,530 A * | 11/1993 | Duhon et al. ................ 200/317 |
| 5,309,331 A | 5/1994 | Anzai et al. ................ 362/80.1 |
| 5,406,465 A | 4/1995 | Farchione .................... 362/72 |
| 5,490,048 A * | 2/1996 | Brassier et al. ............. 362/249 |
| 5,490,049 A * | 2/1996 | Montalan et al. ........... 362/240 |
| 5,526,236 A * | 6/1996 | Burnes et al. .............. 362/249 |
| 5,566,384 A | 10/1996 | Chien .......................... 362/84 |
| 5,580,156 A * | 12/1996 | Suzuki et al. ................ 362/240 |
| 5,595,441 A | 1/1997 | McGee ........................ 362/250 |
| 5,632,551 A | 5/1997 | Roney et al. ................ 362/249 |
| 5,634,706 A | 6/1997 | Barry ........................... 362/72 |
| 5,700,080 A | 12/1997 | Okuda ......................... 362/80 |
| 5,887,968 A * | 3/1999 | Logan ........................ 362/241 |
| 5,975,715 A | 11/1999 | Bauder ....................... 362/226 |
| 6,015,223 A | 1/2000 | Kidd et al. .................. 362/503 |
| 6,053,626 A | 4/2000 | Zagrodnik et al. .......... 362/473 |

(Continued)

Primary Examiner—Alan Cariaso
(74) Attorney, Agent, or Firm—Westman, Champlin & Kelly, P.A.

(57) ABSTRACT

A modular light for decorative use on light strips on motorcycles or similar vehicle has an outer lens or light transmitting housing that forms an interior chamber. The chamber has an open side, and a light transmitting wall is opposite from the open side through which light will be transmitted. A circuit board carrying a plurality of LEDs is shaped to close the open side of the chamber in the light transmitting housing. The circuit board supports a reflector that has openings through which the LEDs protrude. The circuit board is secured in place in the light transmitting housing to form a modular light that be used in a number of locations. The modular light fits into a support housing on a light support strip or similar structure that will mount the modular light in desired locations on a vehicle.

8 Claims, 3 Drawing Sheets

U.S. PATENT DOCUMENTS

| | | | |
|---|---|---|---|
| 6,076,950 A | 6/2000 | Topping et al. | 362/545 |
| 6,149,288 A | 11/2000 | Huang | 362/545 |
| 6,152,590 A | 11/2000 | Furst et al. | 362/545 |
| 6,158,882 A | 12/2000 | Bischoff, Jr. | 362/488 |
| 6,186,653 B1 | 2/2001 | Tyves et al. | 362/549 |
| 6,193,392 B1 * | 2/2001 | Lodhie | 362/235 |
| 6,641,284 B2 * | 11/2003 | Stopa et al. | 362/240 |

* cited by examiner

MODULAR LIGHT ASSEMBLY FOR DECORATIVE LIGHTS

This application refers to and claims priority from U.S. Provisional Application Ser. No. 60/383,514, filed May 28, 2002, the content of which is incorporated by reference.

BACKGROUND OF THE INVENTION

The present invention relates to a decorative light strip primarily for motorcycles, which has light emitting diodes (LED) lights in light housings spaced along a support strip. The LED lights are mounted onto circuit boards that are fixed in place in outer light transmitting housings. The housings snap into receptacles on the support strip. A light reflector strip through which the LEDs extend enhances the intensity of the light emitted by the LEDs.

The use of LEDs for decorative light strips has been known, and also LED lights have been used for replacement tail lights and clearance lights, as well as turn signals lights on motorcycles. However, a modular light housing that can be snapped into a support light strip for rapid and ready use has not been designed. The lighting intensity is further enhanced by providing a strip light reflector for the LEDs.

SUMMARY OF THE INVENTION

The present invention relates to a modular decorative light that can be used in light strips of various arrangements. The modular light comprises LEDs mounted onto a circuit board, in the normal manner. A reflector extends along the circuit board and the LEDs protrude through openings in the reflector. The circuit board and reflector are fixed to sidewalls of a light transmitting housing that has a light transmitting side or lens. The circuit board seals and encloses an interior chamber formed by the light transmitting housing. The light transmitting housing and lens usually is of amber or red color.

The circuit board and the light transmitting housing will fasten into a retainer housing on a light support strip. The retainer housing surrounds an opening through the light support strip, and is on a back side of the light support strip, so that the lens of the light transmitting housing will protrude a desired amount out through the front side of the light support strip when snapped in place and provide illumination that is intense.

The individual light transmitting housings or lenses can be arranged in various configurations along light supports that are either in form of strips, L-shaped supports, U-shaped supports, or other configurations. The light assembly is easily formed, and can be custom made for different types or makes of motorcycles and other vehicles on which clearance lights, or other light strips or bars are used.

DETAILED DESCRIPTION OF THE PREFERRED EMBODIMENTS

Figure 1:
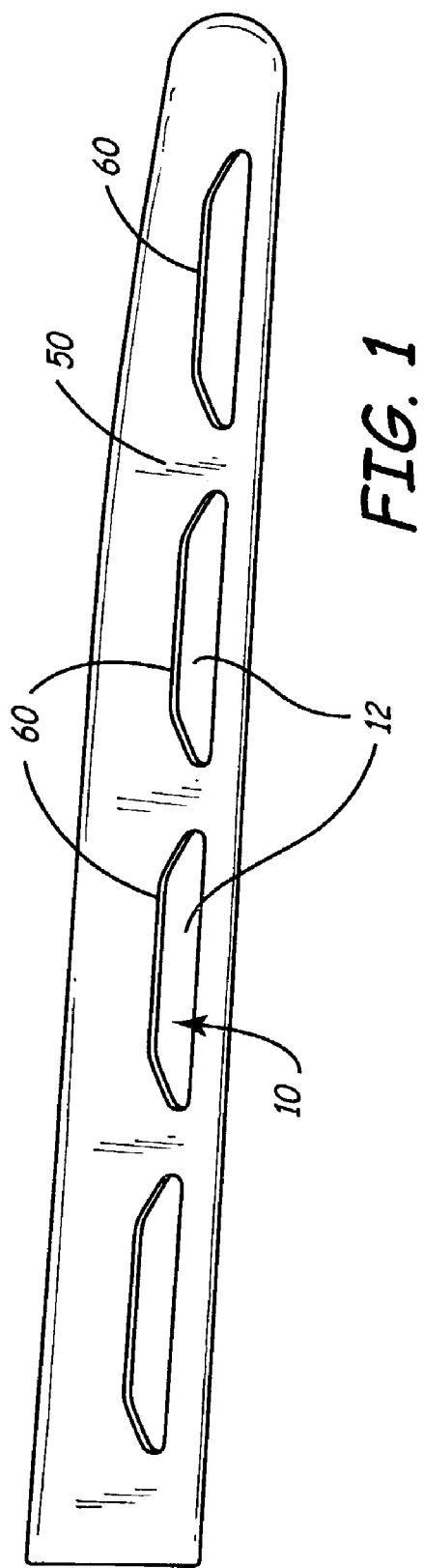
FIG. 1 is a plan view of the typical light strip having a number of the modular light housings installed in it.
Figure 2:
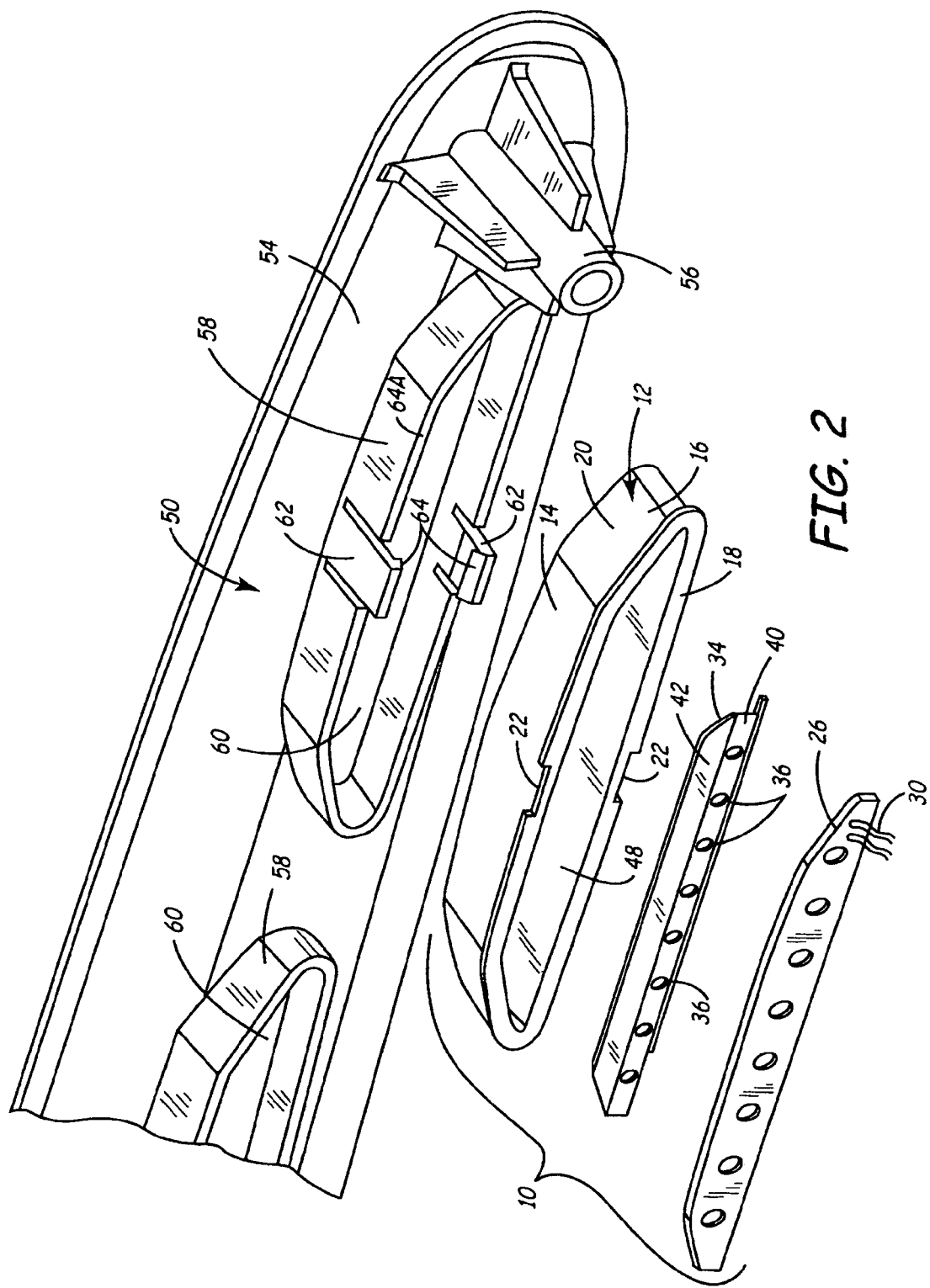
FIG. 2 is an exploded fragmentary view of a single light support strip or mounting bar showing the modular construction of the individual light modules.

Referring to FIGS. 1 and 2, a modular light indicated at 10, is exploded in FIG. 2, and is positioned adjacent a light strip 50 on which the modular light mounts. Modular light assembly 10 includes a light transmitting housing 12, that has a desired outer configuration, and as can be seen, the light transmitting housing 12 has a center portion 14, and tapered end portions 16 that provide a tapered configuration as can be seen in FIG. 1.

Figure 3:
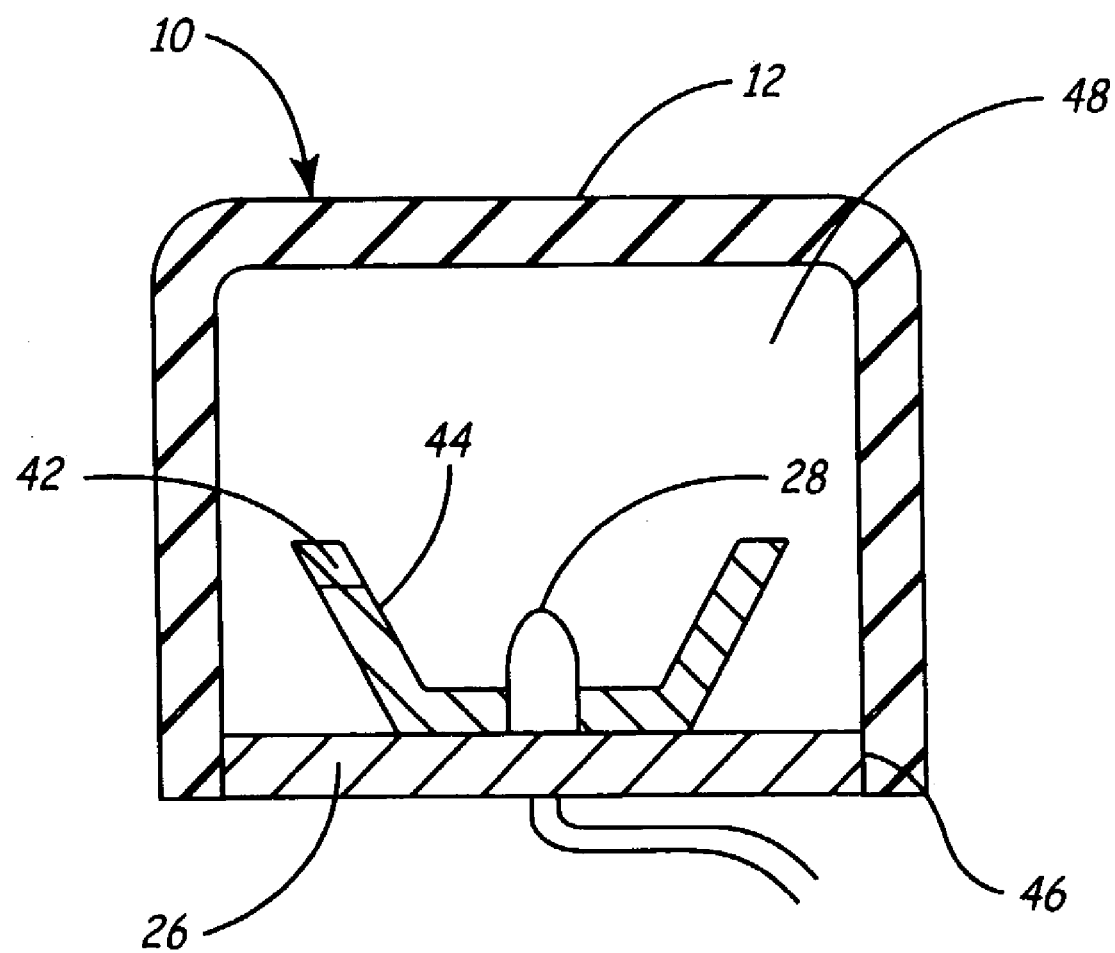
FIG. 3 is a sectional view showing the mounting of a circuit board, light transmitting or transparent housing, and reflector for the LEDs.

The housing 12 has a rear flange 18 that is a larger size than (extends outwardly beyond) the main body 20 of the housing 12. The flange 18 has notches 22 formed therein. The light assembly 10 includes an LED circuit board 26, that supports light-emitting diodes 28 thereon in a line, as shown in FIG. 3. Suitable leads 30 that are connectable to the electrical system on a vehicle, such as a motorcycle, in which the light 10 is used are provided. The LEDs are connected in a suitable circuit so the light is on when desired. A reflector strip 34 is provided with openings 36, through which the LEDs 28 will pass. The reflector strip 34 has a center planar panel 40, and side bent up wing portions 42 and provides reflecting or polished surfaces 44 on which light from the LEDs 28 protruding through the openings 36, impinges. The light is reflected out through the outer side wall of the light transmitting housing 12. The side wall is the part of the light transmitting housing that is visible when it is mounted in use.

The circuit board 26 is fastened into the center opening 48 of the housing 12, as shown in FIG. 3, and secured in place with a suitable adhesive or sealant. It also can snap in place and suitable can be gaskets used to seal the edges of the circuit board 26 to the light transmitting housing 12.

The illustrated junction between the circuit board 26 and the light transmitting housing 12 is shown at 46 in FIG. 3. An adhesive is used, which also is a sealant, but other types of connections, such as screws, interlocking grooves and ribs, spring latches and the like can be used for attaching the circuit board 26 to the light transmitting housing 12.

The modular light assembly 10 is made to mount into a light support strip 50. The light support strip 50 has a main flange portion 54 that will rest against a surface of a vehicle, such as a motorcycle, and has mounting sleeves 56 that can receive screws for holding the light support strip in place. The light support strip 50 also has light support housings 58 that extend from the back side of the flange 54. As can be seen the light support housings 58 are provided with a wall that is shaped to receive and be complimentary to the shape of the light transmitting housing or lens 12 so that the light transmitting housing or lens 12 can fit in.

The light support strip has an opening 60 in the outer wall, so that the outer side wall of the light transmitting housing will fit or slightly protrude through the light strip when the light transmitting housing is in place. The center portion of the support housing 58 has spring latches 62 that are formed to have hooks 64 that will fit into the slots or grooves 22 on the flange 18 and snap in place to hold the light transmitting housing or lens 12 securely in place. The flange 18 rests against an edge 64A of the support housing 58 on the light strip.

Thus, the light assembly 10 is a modular unit, that is secured together by using the circuit board to close the open side of the light transmitting housing or lens. The enclosed modular assembly then can be slipped into a mounting housing and snapped in place. It can be seen that the light support strip 50 can be formed from plastic or similar materials, and the positioning of the housings that receive the modular lights 10 can be any place that is desired.

The light transmitting housing 12 can be made of suitable plastic as well, and, as stated, can be colored or shaded as needed for clearance lights, or just decorative lights on a motorcycle or other vehicle, such an all terrain vehicles, automobiles, trucks, or the like.

The modular light assembly 10 is quickly put into place, and also quickly formed. The reflector 34 adds intensity to the LEDs 28, so that the lights are highly visible.

Although the present invention has been described with reference to preferred embodiments, workers skilled in the art will recognize that changes may be made in form and detail without departing from the spirit and scope of the invention.

What is claimed is:

1. A decorative light strip having supports receiving fasteners to mount the light strip on a vehicle surface; a plurality of openings through the light strip, a separate light transmitting housing releasably supported at each opening, each light transmitting housing having a length along a longitudinal axis and forming an interior chamber, a circuit board of size to fit an open side of the interior chamber, and having a length extending along the longitudinal axis, a plurality of light-emitting diodes on the circuit board in a line along the longitudinal axis, and an elongated reflector extending along the length of the circuit board, and having a flat wall with apertures through which the light emitting diodes extend, the reflector having side walls on opposite edges of the flat wall positioned at acute angles to the flat wall to provide reflecting surfaces adjacent the LEDs to reflect light out through a respective light transmitting side wall of the respective light transmitting housing, such that the light strip has a plurality of lights along a length thereof.

2. The decorative light strip of claim 1 and a flange surrounding an open side of the chamber formed by the light transmitting housing, said flange having receptacles and a light housing support on the light strip at each opening including snap-in latches fitting into the receptacles of a respective light transmitting housing.

3. The decorative light strip of claim 1, wherein said light-emitting diodes are centered along a straight line on the circuit board.

4. A decorative light strip comprising a panel, said panel having a front side and a back side, the back side having a support housing formed of walls extending outwardly from the back side, said walls being formed in a desired peripheral shape, a latch on the walls of the light strip support housing, a modular light housing comprising a lens that transmits light of complimentary configuration to the walls of the support housing on the light strip, and fitting within the walls, a circuit board in the modular light housing carrying a plurality of LEDs thereon, and a reflector mounted on the circuit board and having openings through which the LEDs pass, said reflector having a reflecting surface that reflects the light outwardly when the lens is in place within the walls of the support housing on the light strip.

5. The light strip of claim 4, wherein said walls of the support housing have a pair of spring latches that engage a portion of the modular light housing to hold the modular light housing in place in the support housing.

6. The light strip of claim 5, wherein said LEDs are arranged in a straight line on the circuit board, and the reflector has a series of holes through which the LEDs fit.

7. The light strip of claim 6, wherein said circuit board is secured to said modular light housing, so that the lens, reflector and circuit board form a separate module engaging the latches on the walls of the support housing of the light strip.

8. A modular light comprising an outer mounting housing, a light transmitting housing having an interior chamber and of size and shape to fit within the outer mounting housing, a circuit board of size to fit an open side of the interior chamber, a plurality of light-emitting diodes on the circuit board, and an elongated reflector extending along the length of the circuit board, and being positioned to provide reflecting surfaces for the LEDs to reflect light out through a light transmitting side wall of the light transmitting housing, a flange surrounding an open side of the chamber formed by the light transmitting housing, said outer mounting housing having latches to engage the flange to retain the light transmitting housing in place in the outer mounting housing with the light transmitting side wall visible through an opening in the outer mounting housing.

* * * * *